United States Patent [19]

Hayashi et al.

[11] Patent Number: 4,923,027

[45] Date of Patent: May 8, 1990

[54] REAR WHEEL BRAKE OPERATING SYSTEM FOR MOTORCYCLE

[75] Inventors: Tsutomu Hayashi, Tokyo; Tetsuya Ichikawa; Kiyoshi Katahira, both of Saitama; Yoshinobu Tateshima, Saitama; Takushi Matsuto; Yoshihiro Nakajima, both of Tokyo; Kazuhiko Nakamura, Kanagawa; Nobuyuki Yakigaya, Chiba; Mitsuru Saito, Tokyo; Kenji Sakakibara, Saitama, all of Japan

[73] Assignee: Honda Giken Kogyo Kabushiki Kaisha, Tokyo, Japan

[21] Appl. No.: 137,478

[22] Filed: Dec. 23, 1987

[30] Foreign Application Priority Data

Dec. 25, 1986 [JP] Japan ............................... 61-310395
Feb. 20, 1987 [JP] Japan ............................... 62-37546

[51] Int. Cl.⁵ ........................ B60T 11/20; B60T 13/00
[52] U.S. Cl. ................................... 180/219; 180/230; 188/181 A; 188/344; 188/354; 280/703; 303/9.61; 303/9.64
[58] Field of Search ............... 180/230, 219; 280/703, 280/715; 188/344, 181 A, 354, 16; 303/6 A, 9.61, 9.64, 113, 6.01, 6.1

[56] References Cited

U.S. PATENT DOCUMENTS

| 2,431,667 | 11/1947 | Frank | 188/354 X |
| 4,091,690 | 5/1978 | Miyao | 74/865 |
| 4,120,540 | 10/1978 | Devlieg | 303/117 |
| 4,421,359 | 12/1983 | Hayashi | 303/9.61 |
| 4,456,310 | 6/1984 | Hayashi | 303/10 |
| 4,465,322 | 8/1984 | Hayashi | 303/9.64 |
| 4,492,284 | 1/1985 | Hayashi | 180/219 |
| 4,494,800 | 1/1985 | Hayashi | 188/344 X |
| 4,505,519 | 3/1985 | Muterel | 188/354 X |
| 4,598,954 | 7/1986 | Hayashi | 188/345 X |
| 4,673,221 | 6/1987 | Hayashi et al. | 188/345 X |
| 4,697,825 | 10/1987 | Hayashi et al. | 280/703 |
| 4,735,050 | 4/1988 | Hayashi | 60/489 |
| 4,741,251 | 5/1988 | Hayashi | 92/57 |
| 4,745,748 | 5/1988 | Hayashi et al. | 60/489 |
| 4,748,898 | 6/1988 | Hayashi et al. | 60/487 X |

FOREIGN PATENT DOCUMENTS 0186500 7/1986 European Pat. Off.
61-153057 11/1986 Japan.

Primary Examiner—Mitchell J. Hill
Attorney, Agent, or Firm—Lyon & Lyon

[57] ABSTRACT

In a motorcycle with a pair of left and right steps mounted in a projecting manner on a lower portion of a vehicle body, a pair of left and right brake pedals capable of independently operating the rear wheel brake are pivoted on the vehicle body in close vicinity to the left and right steps, respectively. When a driver turns the motorcycle in either left or right direction with his one foot being placed on the ground, the driver can operate the rear wheel brake using the opposite foot.

26 Claims, 20 Drawing Sheets

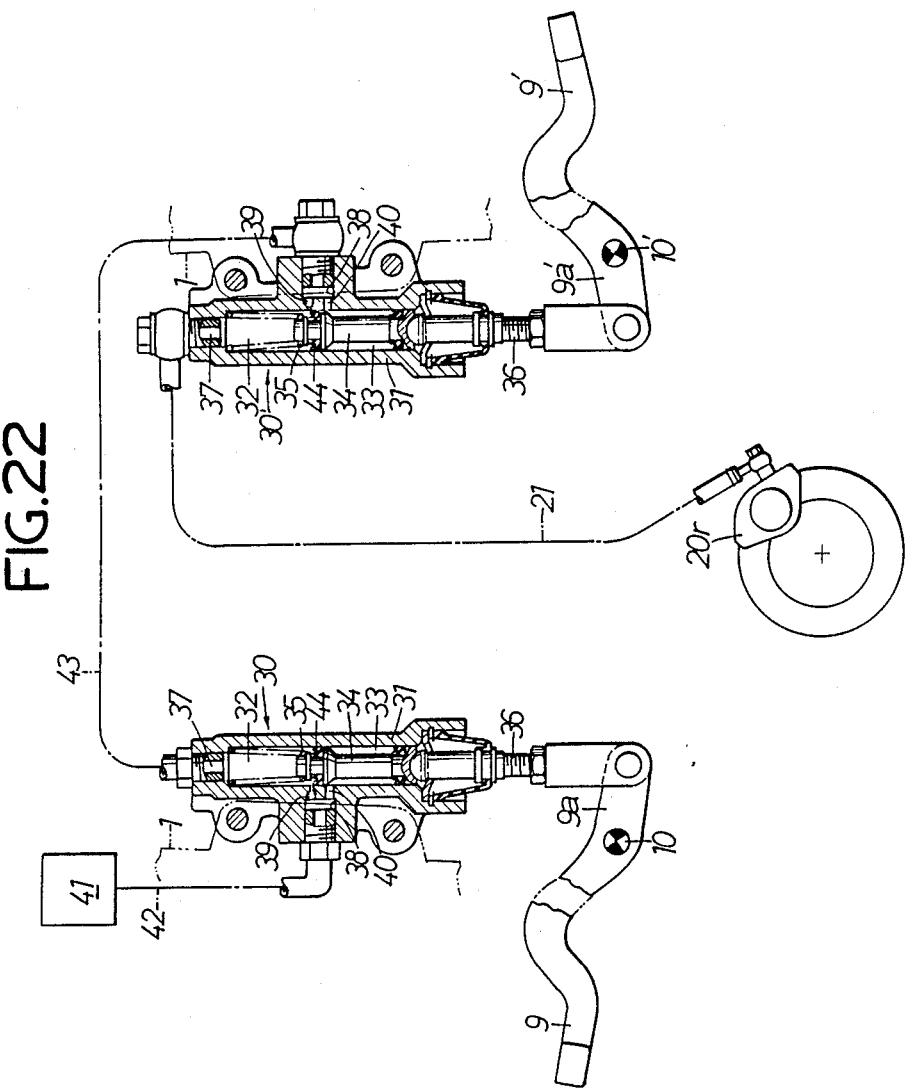

REAR WHEEL BRAKE OPERATING SYSTEM FOR MOTORCYCLE

BACKGROUND OF THE INVENTION

1. FIELD OF THE INVENTION

The present invention relates to a rear wheel brake operating system for a motorcycle with a pair of left and right steps mounted in a projecting manner on a lower portion of a vehicle body.

2. DESCRIPTION OF THE PRIOR ART

In conventional common motorcycles, only a single brake pedal for operating a rear wheel brake is mounted in close vicinity to a right step.

With a motorcycle, particularly a motocross type motorcycle adapted to travel on rough lands and roads, turning of the motorcycle during travelling on a rough terrain is commonly achieved by a driver assuming an attitude with his foot located in a turning direction being placed on the ground to balance the vehicle body inclined in the turning direction. In this case, if the motorcycle includes a brake pedal only on the side of the right step as described above, it is possible to operate the brake pedal by the right foot put on the right step to finely control the rear wheel brake even if the left foot is placed on the ground during a counterclockwise turning of the motorcycle. But it is difficult to simultaneously conduct grounding of the right foot and controlling of the rear wheel brake during a clockwise turning of the motorcycle. Therefore, there is a limit to increase a turning speed in the latter case.

SUMMARY OF THE INVENTION

The present invention has been accomplished with such circumstances in view, and it is an object of the present invention to provide a rear wheel brake operating system for a motorcycle, wherein even if a driver has his either left or right foot placed on the ground during turning of the motorcycle, a rear wheel brake can be controlled at any time by the other foot placed on a step, and the turning speed can be increased.

To accomplish the above object, one feature of the present invention is in that a pair of left and right brake pedals capable of independently operating the rear wheel brake are pivoted on a vehicle body in close vicinity to left and right steps, respectively.

With the above construction, it is possible, for a driver on a motorcycle adapted to travel on rough terrain, to control the rear wheel brake at any time through the operation of the brake pedal by either of left and right feet. Therefore, during turning of the motorcycle, it is possible to easily, simultaneously conduct grounding of one foot and controlling of the rear wheel brake regardless of turning directions of the motorcycle, and to increase the turning speed.

The above and other objects, features and advantages of the invention Will become apparent from reading of the following detailed description of preferred embodiments, taken in conjunction with the accompanying drawings.

BRIEF DESCRIPTION OF THE DRAWINGS

FIGS. 1 to 20 illustrate a first embodiment of the present invention, wherein

FIG. 1 is a side view of a motorcycle equipped with a system of the first embodiment;

FIG. 2 is a plan view of the motorcycle;

FIG. 3 is a perspective view of details of the motorcycle;

FIG. 4 is a schematic diagram of an automatic transmission;

FIG. 5 is a plan view in longitudinal section of the transmission;

FIG. 6 is a sectional view taken along a line VI—VI in FIG. 5;

FIG. 7 is a sectional view taken along a line VII—VII in FIG. 6;

FIG. 8 is a view taken in a direction indicated by an arrow VIII in FIG. 6;

FIG. 9 is a sectional view taken along a line IX—IX in FIG. 5;

FIG. 10 is a sectional view taken along a line X—X in FIG. 9;

FIG. 11 is a sectional view taken along a line XI—XI in FIG. 5;

FIG. 12 is a view taken in a direction indicated by an arrow XII in FIG. 11;

FIG. 13 is a sectional view taken along a line XIII—XIII in FIG. 6;

FIGS. 14, 15, 16 and 17A are sectional views taken along lines XIV—XIV, XV—XV, XVI—XVI and XVII—XVII in FIG. 13, respectively;

FIG. 18 is an operational view similar to FIG. 13;

FIG. 19 is an enlarged sectional view taken along a line XIX—XIX in FIG. 6; and

FIG. 20 is a perspective exploded view similar to FIG. 19; and

FIGS. 21 and 22 illustrate a second embodiment of the present invention, wherein FIG. 21 is a back view of a motorcycle equipped with a system of the second embodiment; and FIG. 22 is a developed view in longitudinal section of details of the system of the second embodiment.

DESCRIPTION OF THE PREFERRED EMBODIMENTS

The present invention will now be described by way of several embodiments with reference to the accompanying drawings.

Figure 1:
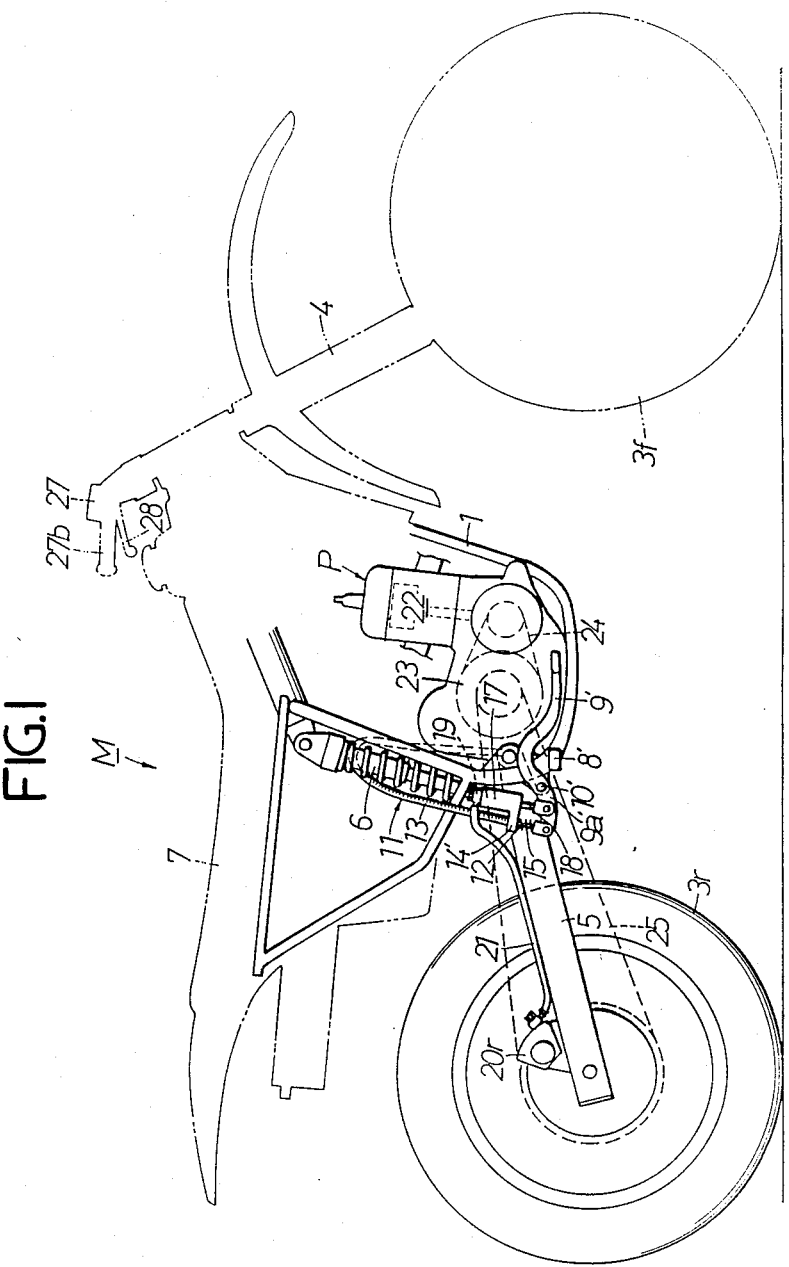
Figure 2:
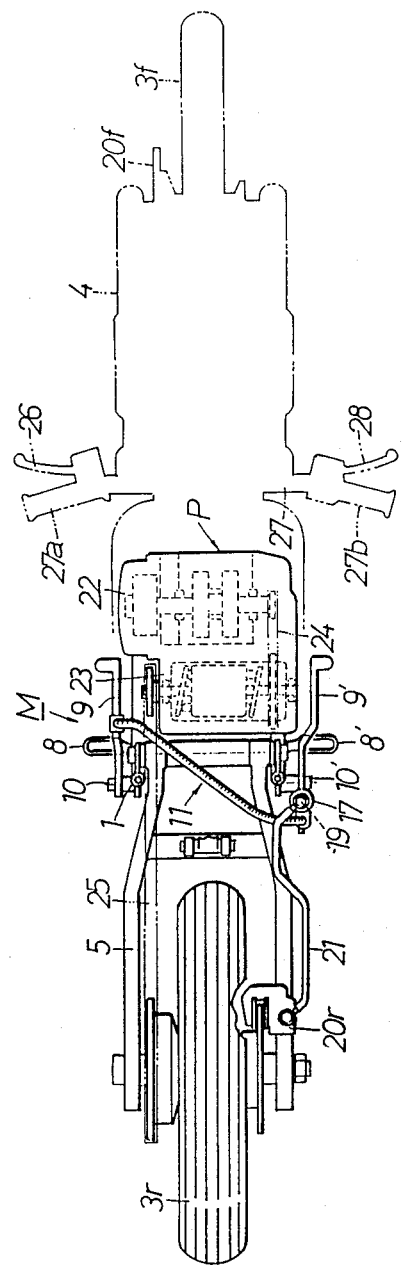
Figure 3:
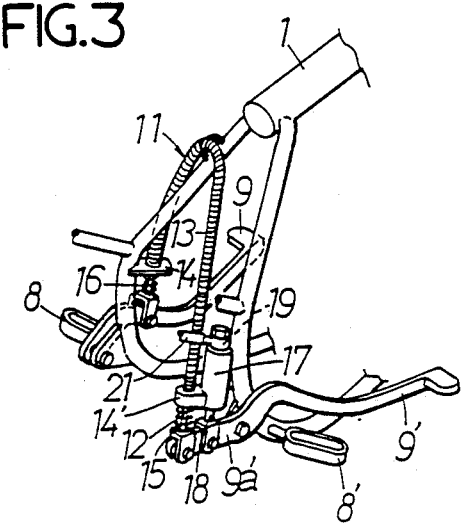

FIGS. 1 to 20 illustrate a first embodiment of the present invention. Referring first to FIGS. 1 to 3, the first embodiment is described. A motorcycle M comprises a power unit p centrally carried on a body frame 1, a front fork 4 steerably connected to a front end of the body frame 1 for supporting a front wheel 3f, and a rear fork 5 vertically slingably connected to a rear end of the body frame 1 for supporting a rear wheel 3r. A rear cushion 6 is interposed between the rear fork 5 and the body frame 1.

A seat 7 astride which a driver sits is mounted on an upper portion of the body frame 1, and a pair of left and right steps 8 and 8' are mounted on the opposite sides of a lower portion of the body frame 1 to project outwardly sideways.

Further, a pair of left and right brake pedals 9 and 9' are pivotally mounted by pivots 10 and 10' on the opposite sides of the lower portion of the body frame 1, and are disposed in close vicinity to the corresponding steps 8 and 8' for depression by driver's feet put on the corresponding steps 8 and 8', respectively.

The right brake pedal 9' is integrally provided with an operating arm 9'a extending rearwardly from the pivot 10'. A rear end of the operating arm 9'a is operably connected with the left brake pedal 9 by a Bowden wire 11 which is comprised of an inner wire 12 connected at its opposite ends to the operating arm 9'a and the left brake pedal 9, respectively, and an outer wire 13 through which the inner wire 12 extends and which is supported at its opposite ends on a pair of left and right brackets 14 and 14'.

A return spring 15 is mounted in compression between the right bracket 14' and the operating arm 9'a for biasing the right brake pedal 9' in an upwardly returning direction, and an auxiliary spring 16 is also provided in compression between the left bracket 14 and the left brake pedal 9 for applying a given tension to the inner wire 12. The set load for the auxiliary spring 16 is set at a level smaller than that of the return spring 15.

A piston rod 18 of a master cylinder 17 mounted on the body frame 1 is connected at its lower end to an intermediate portion of the operating arm 9'a of the right brake pedal 9'. The master cylinder 17 is adapted to deliver a hydraulic pressure through an output port 19 at an upper end thereof when the piston rod 18 thereof is pushed upwardly.

The output port 19 of the master cylinder 17 is connected through a hydraulic oil conduit 21 to a hydraulic oil chamber in a rear wheel brake 20r for braking the rear wheel 3r. Thus, when a hydraulic pressure is delivered through the output port 19, it can be transmitted via the hydraulic oil conduit 21 to the rear wheel brake 20r to operate the latter.

The power unit P includes an engine 22 and an automatic transmission 23 as primary components, so that a power from the engine 22 may be transmitted through a primary speed reduction device 24 to an input member of the automatic transmission 23. An output from the automatic transmission 23 may be transmitted through a secondary speed reduction device 25 to the rear wheel 3r.

The automatic transmission 23 includes a manual clutch mechanism, and a clutch lever 26 for operating this clutch mechanism is pivoted to a steering handle 27 at an upper end of the front fork 4 in close vicinity to a left grip 27a thereof. A brake lever 28 for operating a front wheel brake 20f for braking the front wheel 3f is also pivoted to the steering handle 27 in close vicinity to a right grip 27b thereof.

Figure 4:
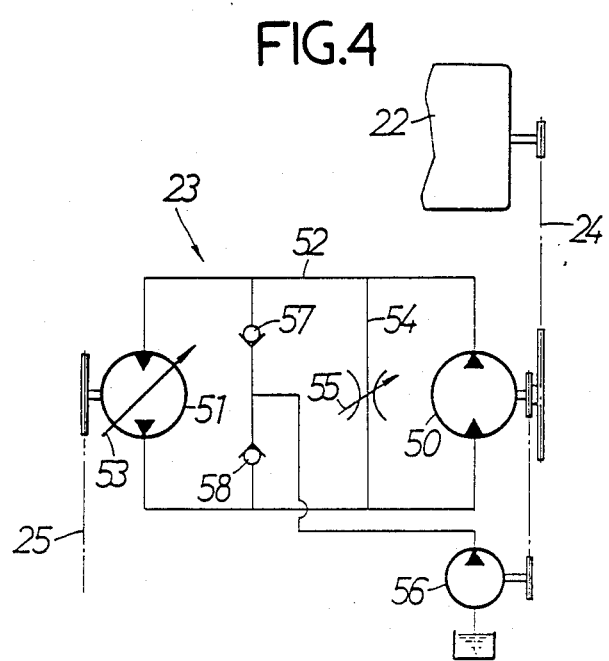

One embodiment of the automatic transmission 23 is illustrated in FIGS. 4 to 20. As schematically shown in FIG. 4, the automatic transmission 23 comprises a swashplate type hydraulic pump 50 driven from the engine 22 through the primary speed reduction device 24, and a swashplate type hydraulic motor 51 for driving the rear wheel 3r through the secondary speed reduction device 25. The swashplate type hydraulic pump and motor are arranged coaxially and interconnected through a hydraulic closed circuit 52.

A swashplate of the hydraulic pump 50 or the hydraulic motor 51 (a swashplate 53 of the hydraulic motor 51 in the illustrated embodiment) is controlled in angle by an automatic shift control device 193 (FIGS. 13 to 18) which will be described hereinafter, whereby the volumetric ratio of the hydraulic motor 51 to the hydraulic pump 50, i.e., the speed shift ratio is controlled in a continuously variable manner. If the swashplate 53 is controlled in this manner by the automatic transmission control device, then a vehicle body need not be equipped with a change pedal and hence, the brake pedals 9 and 9' are correspondingly easily mounted on left and right sides.

A short circuit 54 is provided in the hydraulic closed circuit 62 to connect between an intake side and a discharge side of the hydraulic pump 50, and a clutch valve 55 is mounted in the short circuit 54. The clutch valve 55 is operable in an on-off manner by the clutch lever 26, so that the operation of the lever 26 causes the clutch valve 55 to bring the hydraulic pump 50 into a short-circuited state, thereby providing a so-called clutch-off state which disconnects the transmission of the hydraulic pressure between the hydraulic pump 50 and the hydraulic motor 51.

A supplement pump 56 driven from the input member of the hydraulic pump 50 is connected to the hydraulic closed circuit 52 through first and second check valves 57 and 58, and supplements a working oil of an amount corresponding to a leakage into the hydraulic closed circuit 82.

The more detailed arrangement of the automatic transmission 23 will be described below with reference to FIGS. 5 to 20. The transmission 23 is constructed in the form of a hydrostatic continuously variable transmission, and both of the primary speed reduction device 24 which delivers a power from a crank shaft 101 of the engine 22 to the transmission 23 and the secondary speed reduction device 25 which transmits an output from the transmission 23 to the rear wheel 3r are constructed into a chain type in this embodiment.

The hydraulic pump 50 is constructed into a constant volume type, while the hydraulic motor 51 is constructed into a variable volume type, and then are housed in a casing provided by a crank case 104 for supporting the crank shaft 101.

The hydraulic pump 50 comprises a cup-like cylindrical input shaft 105 as an input member to which an output sprocket 102a of the primary speed reduction device 24 is connected by a plurality of rivets 115 (only one of which is shown), a pump cylinder 107 relatively slidably fitted over an inner peripheral wall at the middle portion of the cylindrical input shaft 105 through a needle bearing 106, a large number of pump plungers 109, 109—slidably revolved respectively in a large and odd number of annularly arranged cylinder bores 108, 108—provided in the pump cylinder 107 to surround a rotational axis of the latter, a pump swashplate 110 abutting against outer ends of the pump plungers 109, 109—, and a pump swashplate holder 112 for supporting a back surface of the swashplate 110 through a thrust roller bearing 111 to maintain the swashplate 110 in an attitude inclined about a phantom trunnion axis 01 perpendicular to an axis of the pump cylinder 107 by a predetermined angle with respect to the axis of the pump cylinder 107. The pump swashplate holder 112 is fixed on a closed end of the cylindrical input shaft 105.

The swashplate 110 enables the pump plungers 109, 109—to be reciprocally moved during rotation of the cylindrical input shaft 105 to repeat intake and discharge strokes.

To improve the ability of the pump plunger 109 following the pump swashplate 110, a coiled spring 115 for biasing the pump plunger 109 to expand is mounted in compression in the cylinder core 108.

On the other hand, the hydraulic motor 51 is comprised of a motor cylinder 117 coaxially disposed leftward from the pump cylinder 107, a large number of motor plungers 119, 119—slidably received in a plurality and odd-number of annularly arranged cylinder bores 118, 118—provided in the motor cylinder 117 to surround a rotational center of the latter, a push rod 127 supported at its inner end on a bottom of a bottomed hole 119a opened in an outer end of each motor plunger 119 and projecting at its outer end outside the motor plunger 119, a motor swashplate 120 abutting against outer ends of the individual push rods 127, a trunnion shaft 22 semicircular in section for supporting a back surface of the motor swashplate 120 on a flat surface thereof through a thrust roller bearing 121, and a swashplate anchor 123 for supporting a cylindrical surface of the trunnion shaft 122 with no clearance for rotation. The swashplate anchor 123 is secured to a side Wall plate 104a of the crank case 104 by a bolt 126 along. With a cylindrical cylinder holder 124 connected to a right end of the swashplate anchor 123. The cylinder holder 124 supports an outer periphery of the motor cylinder 117 through a needle bearing 125 for rotation. The side wall plate 104a of the crank case 104 is releasably secured to a case body by a bolt 146.

The motor swashplate 53 is adapted to be operated by the rotation of the trunnion shaft 122 between a righted position in which it is located perpendicularly to the axis of the motor cylinder 117 and a maximum inclined position in which it is tilted down at a certain angle, and when in the inclined position, the motor swashplate 53 enables the motor plungers 119, 119—to be reciprocally moved with the rotation of the motor cylinder to repeat expansion and shrinkage strokes.

A coiled spring 30 for biasing the motor plunger 119 to expand is mounted in compression in the cylinder bore 118 in order to improve the ability of the motor plunger 119 following the motor swashplate 120.

The pump cylinder 107 and the motor cylinder 117 constitute an integral cylinder block B, and an output shaft 131 is passed through a central portion of the cylinder block B. The motor cylinder 117 is located with its outer end mated to a flange 131a integrally formed on an outer periphery of the output shaft 131, while the pump cylinder 107 is spline-fitted at 132 to the output shaft 131, and a Cir-clip 134 is locked on the output shaft 131 to abut against an outer end of the pump cylinder 107 through a seat plate 133, whereby the cylinder block B is secured to the output shift 131.

A right end of the output shaft 131 extends through the pump swashplate 110, the pump swashplate holder 112, an end wall of the input shaft 105 and a right side wall of the crank case 104, and a thrust roller bearing 140 is interposed between the end wall of the cylindrical input shaft 105 and a support sleeve 37 secured to an outer periphery of that right end by a knock pin 135 and a nut 136. The output shaft 131 is rotatably supported at its right end on the crank case 104 through the support sleeve 137 and a ball bearing 141, and supports the cylindrical input shaft 105 through a needle bearing 142 for rotation.

In addition, a left end of the output shaft 131 extends through the motor swashplate 120, the trunnion shaft 122, the swashplate anchor 123 and the side wall plate 104a of the crank case 104, and a thrust roller bearing 147 is interposed between the swashplate anchor 123 and a support sleeve 145 secured to an outer periphery of that left end by a knock pin 143. The output shaft 131 is rotatably supported at its left end on the swashplate anchor 123 through a needle bearing 148.

Further, an input sprocket 103a of the secondary speed reduction device 25 is secured to the left end of the output shaft 131 outside the crank case 104, thereby enhancing the securing of the support sleeve 145 on the output shaft 131.

In this manner, the all components of from the sprocket 102a to the sprocket 103a for the transmission 23 are assembled, in the form of a single assembly, on the output shaft 131 and hence, mounting and removal of the transmission 23 on and from the crank case 104 can be extremely easily achieved.

To periodically rotate the pump swashplate 110 synchronously with the pump cylinder 107, a synchronously recess 110a is provided in the pump swashplate 110 for engagement by a spherical end 109a of the corresponding plunger 109.

In addition, to rotate the motor swashplate 53 synchronously with the motor cylinder 117, a spherical recess 120a is provided in the motor swashplate 53 for engagement by a spherical end 127a at the outer end of the corresponding push rod 127.

Each push rod 127 has an inner end 127b formed into a spherical surface having a radius corresponding to the entire length of the rod 127, and is swingable within the bottomed hole 119a of the corresponding motor plunger 119. The bottomed hole 119a is tapered to increase in width toward an opening, so that the push rod 127 abuts against a side surface of the bottomed hole 119a over its substantially entire length, when the push rod 127 is at a limit of swinging movement thereof.

The hydraulic closed circuit 52 is formed between the hydraulic pump 50 and the hydraulic motor 51 in the following manner.

Between the cylinder bores 108, 108—of the pump cylinder 107 and the motor cylinder bores 118, 118—of the motor cylinder 117, the cylinder block B are provided with annular inner and outer oil passages 152 and 153 concentrically arranged around the output shaft 131; first valve bores 154, 154—and second valve bores 155, 155—radially penetrating both of an annular partition wall between both of the oil passages 152 and 153 and an outer peripheral wall of the outer oil passage 153 and provided in the same number respectively as the cylinder bores 108, 108—and 118, 118—; a large number of pump ports a, a—permitting the mutual communication of the adjacent cylinder bores 108, 108—and first valve bores 154, 154—; and a large number of motor ports b, b—permitting the mutual communication of the adjacent cylinder bores 118, 118—and second valve bores 155, 155—.

The inner oil passage 152 is defined in the form of an annular groove between the respective opposed peripheral surfaces of the cylinder block B and the output shaft 131.

On the other hand, the outer oil passage 153 is defined in the form of an annular groove in the outer peripheral surface of the cylinder block B, with open surface thereof being closed by a sleeve 160 welded to the outer peripheral surface of the cylinder block B.

Spool type first distributor valves 55, 55—as clutch valves are slidably received in the first valve bores 181, 154—, and spool type second distributor valves 162, 162—are slidably received in the second valve bores 155, 155—, respectively. A first eccentric ring 163 is mounted to surround and engage outer ends of the first distributor valves 55, 55—, while a second eccentric ring 164 is mounted to surround and engage outer ends of the second distributor valves 162, 162—, both through ball bearings 165 and 166. In order to force these engagements, the first distributor valves 55, 55—are interconnected at their outer ends by a first forcing ring 167 concentric with the first eccentric ring 163, while the second distributor valves 162, 162—are interconnected at their outer ends by a second forcing ring 168 concentric with the second eccentric ring 164. These connected arrangements will be described below.

The first eccentric ring 163 is connected, in the following manner, to the opposite side walls of the cylindrical input shaft 105 through a pair of slide pins 170, 170 parallel to the phantom trunnion axis 01 of the pump swashplate 110.

Figure 7:
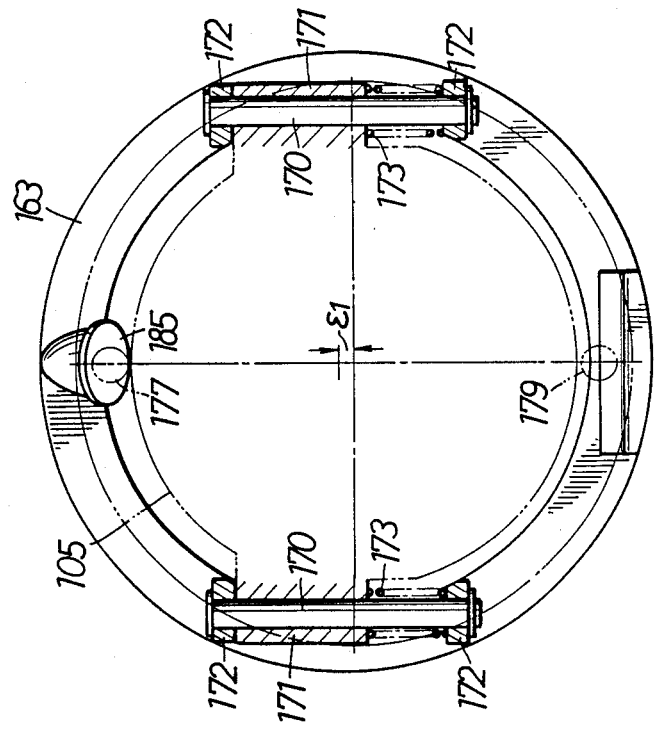
Figure 8:
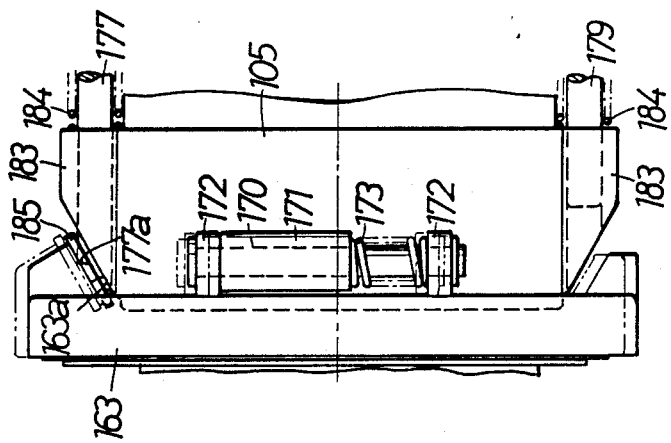

As shown in FIGS. 7 and 8, each of the slide pins 170 is slidably supported at its intermediate portion on a guide pass 171 mounted on the outer surface of the input shaft 105 to project therefrom, and is secured at its opposite ends to a pair of support bosses 172, 172—mounted on one end of the first eccentric ring 163 to project therefrom. A clutch spring 173 is mounted in compression between one of the support bosses 172 and the guide boss 171 for biasing the first eccentric ring 173 in a direction opposite to an eccentric direction thereof. Thus, the first eccentric ring 163 is movable between a clutch-on position n eccentrically offset by a predetermined distance 1 from a center of the output shaft 131 and a clutch-off position f eccentrically offset by a predetermined distance 2 larger than 1 from that center, and is normally maintained in the clutch on position n by a resilient force of the clutch spring 173.

Figure 9:
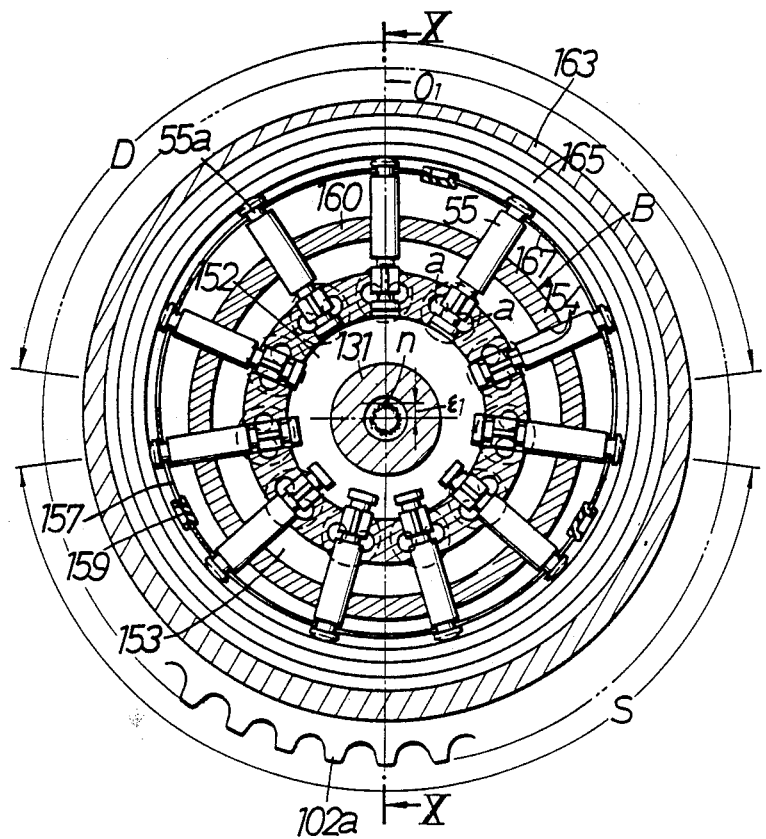

Referring to FIG. 9, when in the clutch-on position n, the first eccentric ring 163, upon occurrence of a relative rotation between the input shaft 105 and the pump cylinder 107, causes the individual first distributor valve 161 to be reciprocally moved in the first valve bore 154 between the radially inner and outer positions in the motor cylinder 107 with a stroke of a distance two times the eccentric amount 1.

Here, a discharge region of the hydraulic pump 50 is designated by D, while an intake region is by S. In the discharge region D, the first distributor valve 55 is being moved through the outer position to bring the corresponding pump port a into communication with the outer oil passage 153, while at the same time putting it out of communication with the inner oil passage 152, so that a working oil is pumped out of the cylinder core 108 into the outer oil passage 153 by the action of the pump plunger 109 which is in a discharge stroke.

In the intake region S, the first distributor valve 55 is being moved through the inner position to bring the corresponding pump port a into communication with the inner oil passage 152, while at the same time putting it out of communication with the outer oil passage 153, so that the working oil is drain out of the inner oil passage 152 into the cylinder bore 108 by the action of the pump plunger 109 which is in an intake stroke.

Figure 9A:
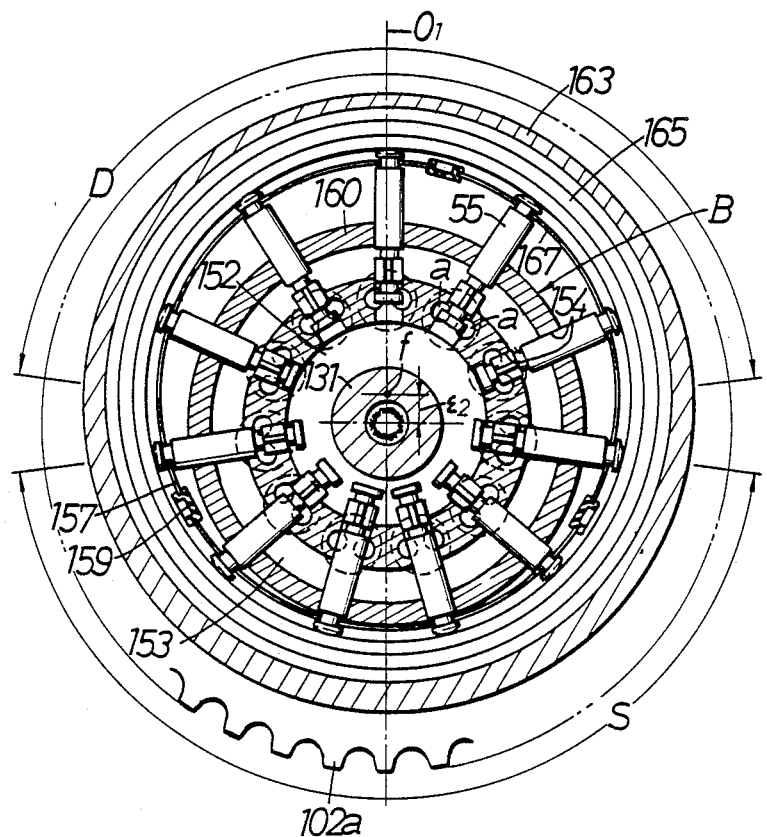
FIG. 9A is an operational view similar to FIG. 9.

Referring to FIG. 9A, when in the clutch off position f, the first eccentric ring 163, upon occurrence of a relative rotation between the input shaft 105 and the pump cylinder 107, causes the individual first distributor valve 55 to be reciprocally moved in the first valve core 154 with a stroke of a distance two times the eccentric amount 2, and particularly in the discharge region D, to be moved into an outermost position to short-circuit the inner oil passage 152 and the outer oil passage 153.

As shown in FIGS. 5 to 9, a clutch control device 175 is connected to the first eccentric ring 163 for shifting the latter to the clutch-off position f.

Figure 6:
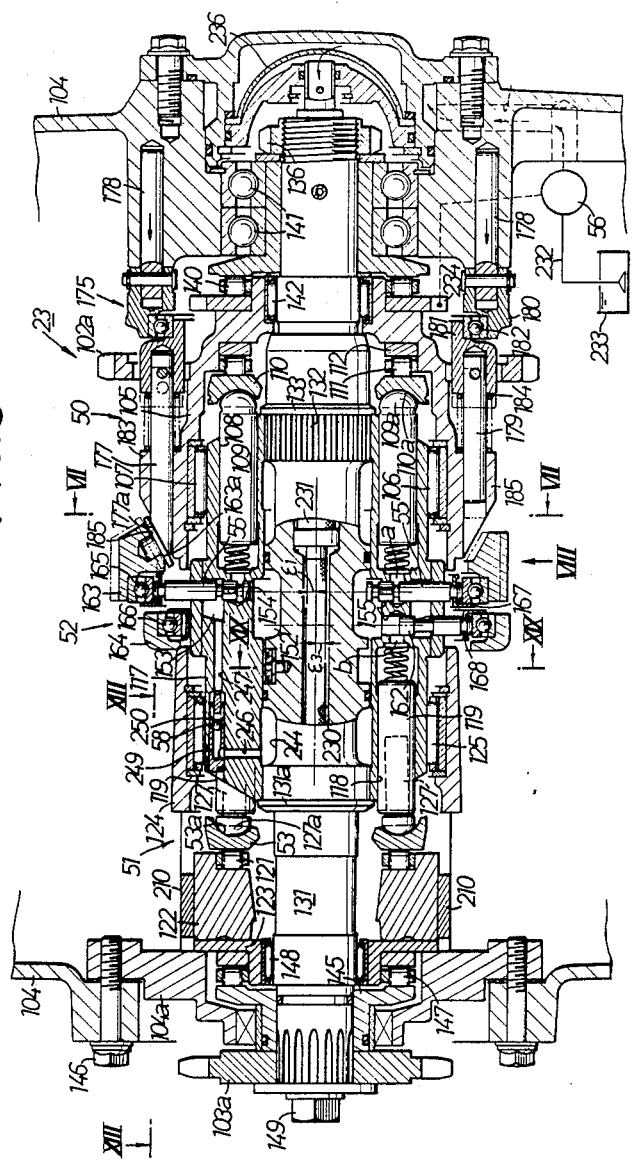

The clutch control device 175 comprises a single first urging rod 176 and two guide rods 178 arranged in parallel to and around the output shaft 131 and slidably supported on a right side wall of the crank case 104, a first urging ring 180 connected with the three rods 176 and 178 to surround the input shaft 105, a second urging ring 181 connected to the first urging ring 180 through a release bearing 182, a single second rod 177 and a single guide rod 179 which are supported on a pair of guide bosses 183 on the opposite side walls of the input shaft 105 for sliding movement in a direction parallel to the output shaft 131, and which are pinned to the second urging ring 181 to pass through the sprocket 102a, and a return spring 184 mounted in a compressed manner between the guide boss 183 and the second urging ring 181 for biasing the second urging ring 181 toward the first urging ring 180. As seen in FIG. 6, the second urging rod 177 is formed on a slant 177a which is inclined toward the output shaft 131 as approaching to the first eccentric ring 163, and which is engaged with a pressure receiving slant 163a formed on an inner peripheral surface of the first eccentric ring 163 on an eccentric side with a shim interposed therebetween. On the other hand, the first urging rod 176 is engaged at its leading end with a cam shaft 186 operably connected to the clutch lever 26, so that the rotation of the cam shaft 186 causes the first urging rod 176 to be camed toward the first urging ring 180.

When the first urging rod 176 is pushed from the cam shaft 186, such movement is transmitted through the first urging ring 180, the release bearing 182 and the second urging ring 181 to the second urging rod 177 to push the latter 177 against a force of the return spring 184, so that the slant 177a at the leading end of the rod 177 slides on the shim 185 to shift the first eccentric ring 163 from the clutch on position n to the clutch-off position f against a force of the clutch spring 173.

In this case, the first eccentric ring 163 causes the slide pins 170, 170 at the opposite sides thereof to slide on the guide bosses 171, 171 of the input shaft 105 and hence, the shifting motion is smooth, and the attitude of the first eccentric ring 163 is constantly stabilized.

The second eccentric ring 164 is connected, in the following manner, to opposite side walls of the cylinder holder 124 through a pair of slide pins 188, 188 parallel to a center line of the trunnion shaft 122, i.e., a trunnion axis 02 thereof.

Figure 5:
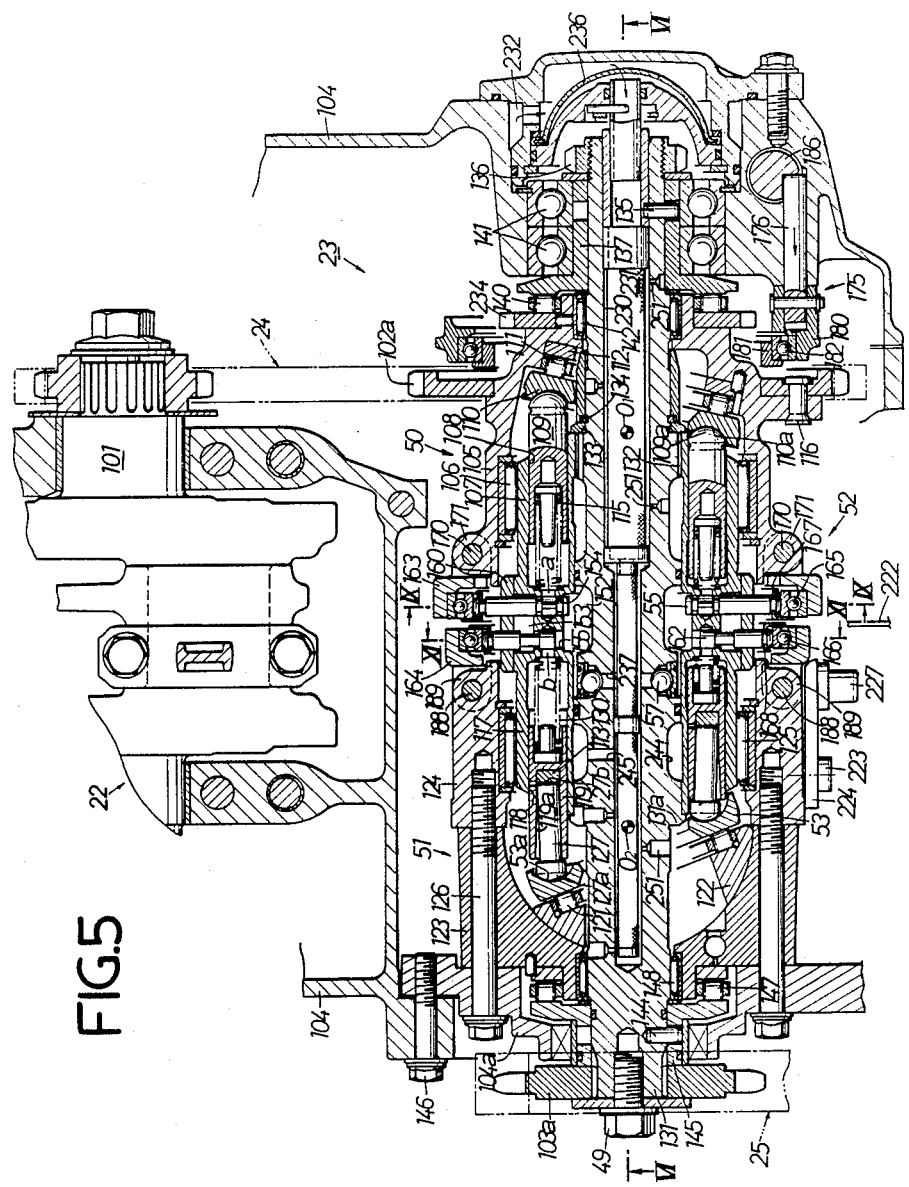
Figure 13:
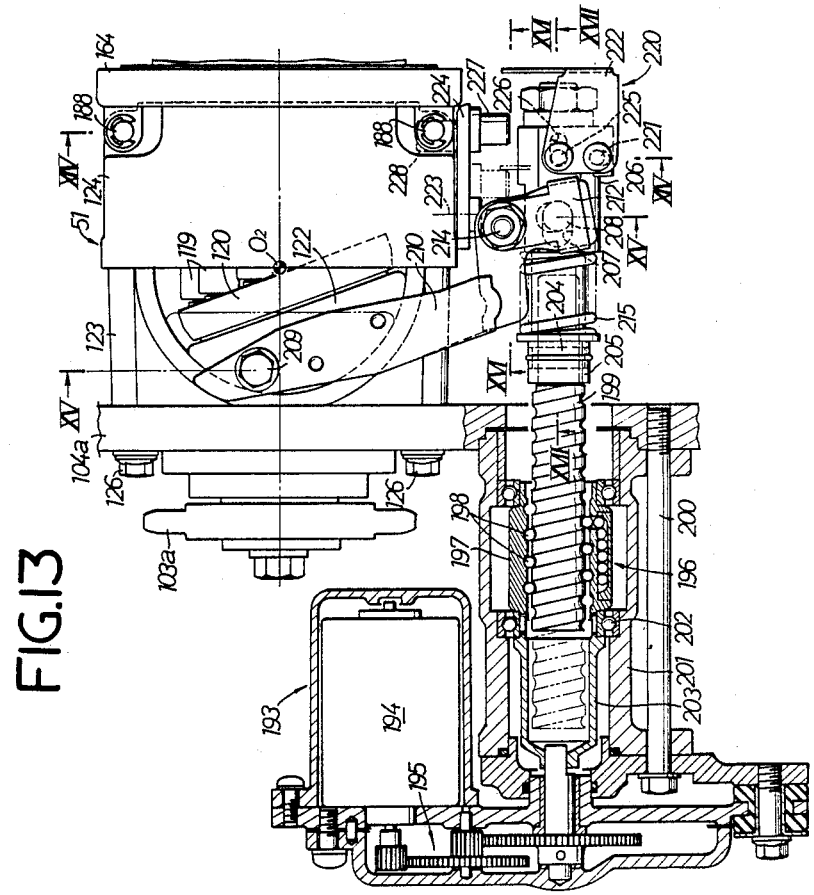
Figure 14:
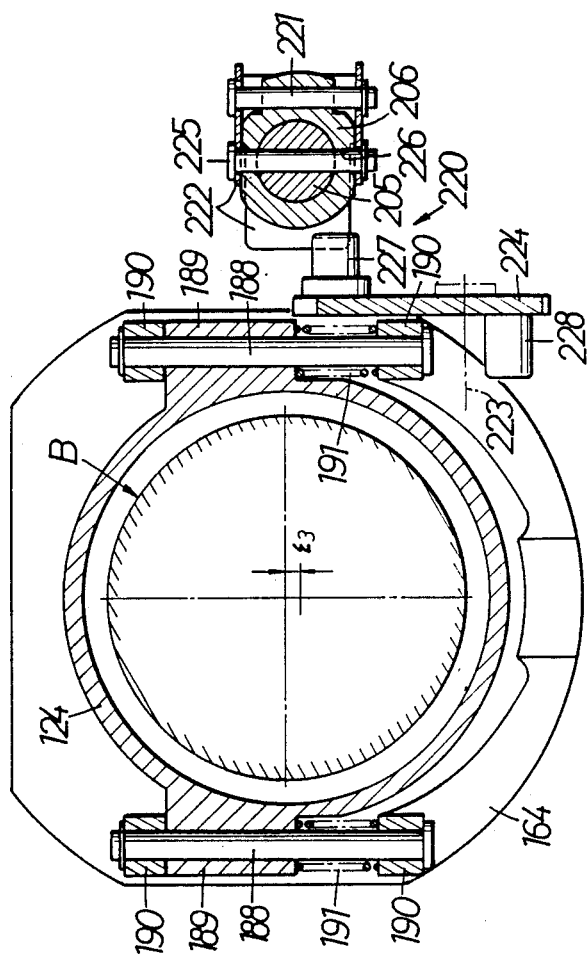
Figure 15:
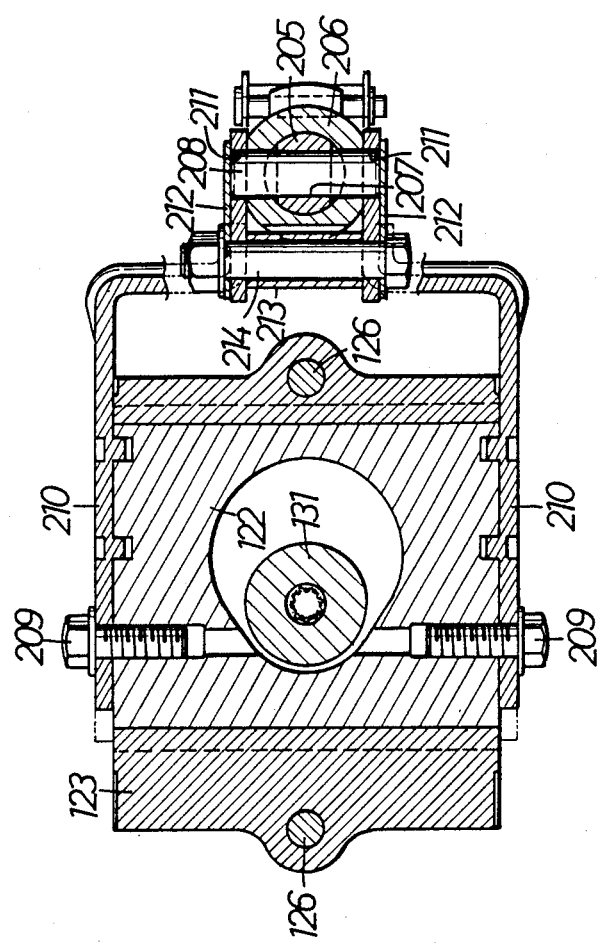
Figure 16:
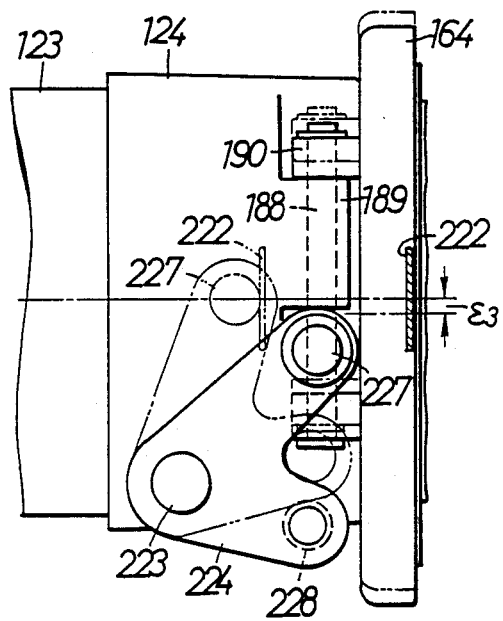

As shown in FIGS. 5, 13 and 14, each pin 188 is slidably supported at its middle portion on a guide boss 189 mounted on the outer surface of the cylinder holder 124, and is secured at its opposite ends to a pair of support bosses 190, 190 mounted on one end face of the second eccentric ring 164. A return spring 191 is compressed between one of the support bosses 190 and the guide boss 189 for biasing the second eccentric ring 164 in an eccentric direction thereof. Thus, the second eccentric ring 164 is movable between a hydraulic pressure transmitting position h eccentrically offset by a predetermined distance 3 from the center of the output shaft 131 along the trunnion axis 02 and a lock-up position 1 in which it is located concentrically with the output shaft 131, and the eccentric ring 164 is maintained in the hydraulic pressure transmitting position h by the return spring 191.

Figure 11:
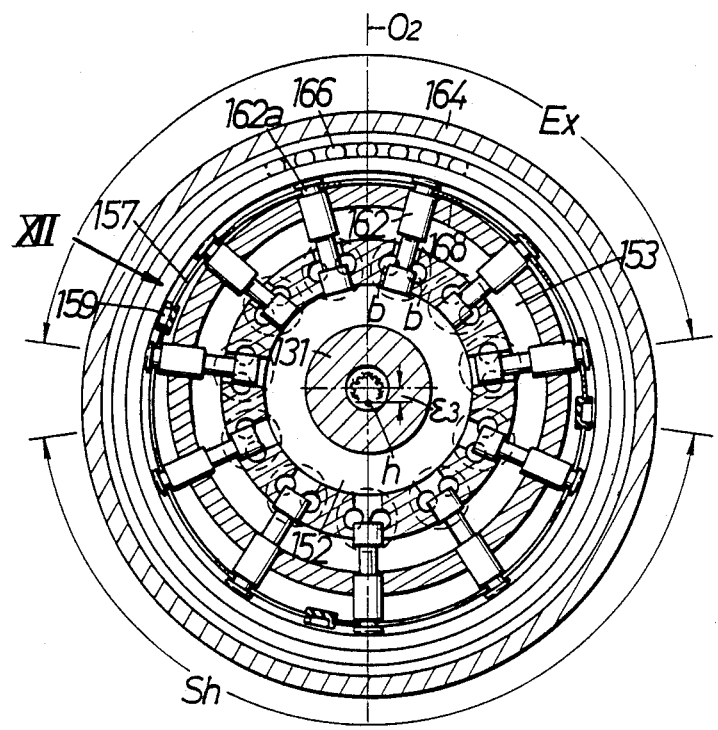

As seen in FIG. 11, when in the hydraulic pressure transmitting position h, the second eccentric ring 164 causes each second distributor valve 162 upon rotation of the motor cylinder 117 to be reciprocally moved in the second valve core 155 between the radially inner and outer positions of the motor cylinder 117 with a stroke of a distance two times an eccentric amount 3.

Here, an expansion region of the hydraulic motor 51 is designated by Ex, while a contraction or shrinkage region is by Sh. In the expansion region Ex, the second distributor valve 162 is being moved through the inner position to bring the corresponding motor port b into communication with the outer oil passage 153, while at the same time putting it out of communication with the inner oil passage 152, so that a high pressure working oil is supplied from the outer oil passage 153 into the cylinder bore 118 of the motor plunger 119 which is in an expansion stroke.

In the contraction region Sh, the second distributor valve 162 is being moved through the outer position to bring the corresponding motor port b into communication with the inner oil passage 152, while at the same time putting it out of communication with the outer oil passage 153, so that the working oil is discharged into the inner oil passage 152 from the cylinder core 118 of the motor plunger 119 which is in a contraction stroke.

Figure 11A:
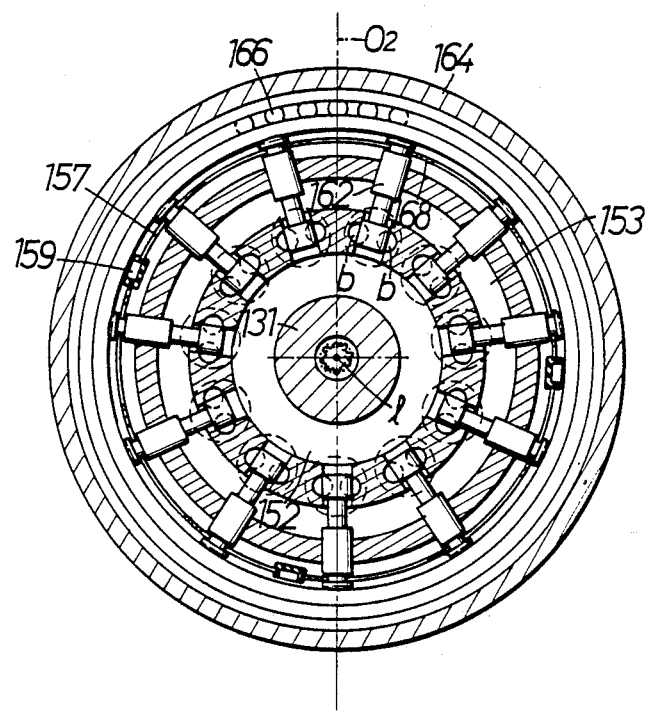
FIG. 11A is an operational view similar to FIG. 11.

As seen in FIG. 11A, when the second eccentric ring 164 assumes the lock-up position 1, all the second distributor valves 162, 162—simultaneously closes the corresponding motor ports b.

For every one cylinder bore 108, a pair of the aforesaid pump ports a are provided side by side in a direction perpendicular to a direction of sliding movement of the first distributor valve 55. Also, for every one cylinder bore 118, a pair of the aforesaid motor ports b are provided side by side in a direction perpendicular to a direction of sliding movement of the second distributor valve 162. If doing so, each distributor valve 55, 162 enables opening and closing of the corresponding pump port a, b with a relatively short stroke thereof, while insuring a larger total passage area of the pump ports a and the motor ports b.

With the above construction when the cylindrical input shaft 105 of the hydraulic pump 51 is rotated through the primary speed reduction device 24 under a condition of the first eccentric ring 163 maintained in the clutch-on position n and of the second eccentric ring 164 maintained in the hydraulic pressure transmitting position h, the pump swashplate 110 causes the pump plungers 109, 109—to be alternately placed under the discharge and intake strokes.

Thus, the pump plunger 109 pumps a working oil from the cylinder bore 108 into the outer oil passage 153 during passing through the discharge region D, and draws the working oil from the inner oil passage 152 into the cylinder bore 108 during passing through the intake region S.

The high pressure working oil pumped into the outer oil passage 153 is supplied into the cylinder core 118 of the motor plunger 119 located in the expansion region Ex of the hydraulic motor 51, on the one hand and is discharged from that cylinder bore 118 into the inner oil passage 152 by the motor plunger 119 located in the shrinkage region Sh, on the other hand.

During this time, the cylinder block B is rotated by the sum of a reaction torque received by the pump cylinder 107 from the pump swashplate through the pump plunger 109 which is in the discharge stroke and a reaction torque received by the motor cylinder 117 from the motor swashplate 120 through the motor plunger 119 in the expansion stroke and the push rod 127, and the rotational torque of the cylinder block B is transmitted from the output shaft 131 to the secondary speed reduction device 25.

In this case, a speed shift ratio of the output shaft 131 to the input shaft 105 is given by the following equation:

$$\text{Speed shift ratio} = 1 + \frac{\text{Capacity of the hydraulic motor 51}}{\text{Capacity of the hydraulic pump 50}}$$

Therefore, if the capacity of the hydraulic motor 51 is changed from zero to a certain value, the speed shift ratio can be changed from 1 to a certain required value. Moreover, because the capacity of the hydraulic motor 51 is determined by the stroke of the motor plunger 119, the speed shift ratio can be controlled in a continuously variable manner from 1 to a certain value by providing the tilting movement from the righted position to a certain tilted position.

It should be noted that if the motor swashplate 120 is designed to be tilted from the righted position in a direction opposite to the above tilting direction, an acceleration ratio is provided as a speed shift ratio, i.e., an over top condition is provided.

Meanwhile, in the hydraulic motor 51, a thrust of the motor plunger 119 is applied to the motor swashplate 53 through the oscillatable push rod 127 and hence, the motor plunger 119 can slide smoothly in the cylinder bore 118 without reception of a bending load despite a reaction force from the motor swashplate 53. Moreover, the push rod 127 abuts against the inner surface of the tapered, bottomed hole 119a in the motor plunger 119 over its entire length at a limit of oscillation and therefore, the surface pressure on that abutment surfaces can be reduced to assure a durability of the both components 119 and 127.

During such an operation, if the first eccentric ring 163 is shifted to the clutch-off position f, the outer oil passage 153 of a higher pressure is short-circuited to the inner oil passage 162 of a lower pressure through the first distributor valve 55 moving through the discharge region D, so that the higher pressure working oil is not supplied to the hydraulic motor 51, and the transmission of power between the hydraulic pump and the hydraulic motor 51 is blocked. That is, the so-called clutch-off condition is provided.

During operation of the hydraulic pump 50 and the hydraulic motor 51, the pump swashplate 110 receives a thrust load from the pump plungers 109, 109—, and the motor swashplate 53 receives a thrust load from the motor plungers 119, 119—, these thrust loads being in directions opposite to each other. However, the thrust load received by the pump swashplate 110 is supported on the output shaft 131 through the thrust roller bearing 111, the pump swashplate holder 112, the end wall of the input shaft 105, the thrust roller bearing 140, the support sleeve 137 and the nut 136, and the thrust load received by the motor swashplate 53 is likewise supported on the output shaft 131 through the thrust roller bearing 121, the trunnion shaft 122, the swashplate anchor 123, the thrust roller bearing 147, the support sleeve 145, the sprocket 103a and the bolt 149. Therefore, such thrust loads merely produce a tensile stress in the output shaft 131 and would not act on the crank case 104 supporting the shaft 131 at all.

In addition, since the trunnion shaft 122 semicircular in section supports the back surface of the motor swashplate 53 on the flat surface thereof through the thrust roller bearing 121 and has the cylindrical surface rotatably supported on the swashplate anchor 123 with no clearance, it cannot be flexed even if it receives the thrust load applied to the motor swashplate 53 from the motor plungers 119, 119—. Therefore, it is possible to firmly support the motor swashplate 53 and to provide the smoothly tilting movement of the motor swashplate 53.

Further, since the swashplate anchor 123 is rotatably supported through the needle bearing 148 on the output shaft 131 connected to the cylinder block B, a radial component of the aforesaid thrust load on the motor swashplate 53 can be transferred through the needle bearing 148 to the output shaft 131 and supported on the latter. Consequently, such component of the thrust load is prevented from being transferred to the crank case 104.

Figures 10, 12:
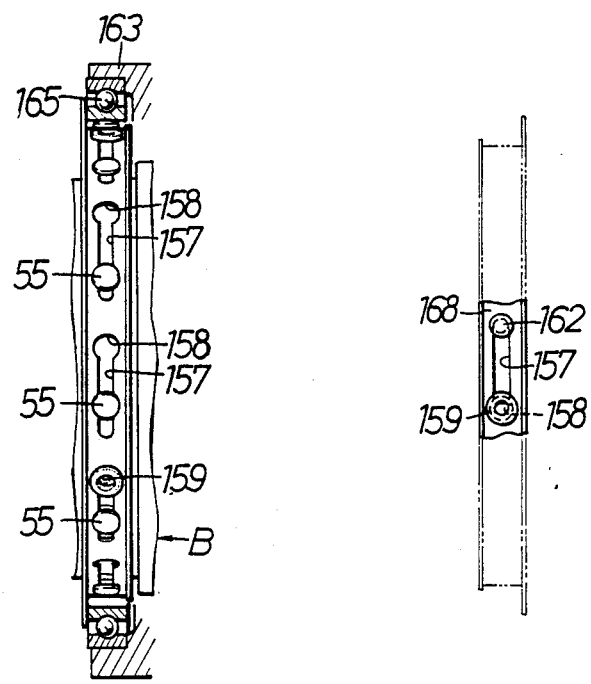

The connecting arrangement for the first distributor valve 161 and the forcing ring 167 is comprised, as shown in FIGS. 9 and 10, of a smaller diameter neck 55a formed on the distributor valve 55, and a circumferential elongated hole 157 perforated in the forcing ring 167 for engagement by the neck 55a. The elongated hole 157 is provided at its one end with an enlarged hole portion 158, so that the larger diameter outer end portion of the distributor valve 161 may be passed through the enlarged hole portion 158. Thus, if the distributor valve 55 is inserted into the enlarge hole portion 158 with the neck 55a thereof aligned with the elongated hole 157, and the forcing ring 167 is then rotated circumferentially, the neck 55a can be engaged in the elongated hole 157. To maintain this engaged state, a resilient plug 159 is fitted into at least one of the enlarged hole portions 158.

The connecting arrangement for the second distributor valve 162 and the forcing ring 168 is similar to that for the first distributor valve 161 and the forcing ring 167, as shown in FIGS. 11 and 12. Therefore, the corresponding parts are designated by the same reference characters, and the detailed description thereof is omitted.

Referring to FIGS. 13 to 18, an automatic shift control device 193 for controlling the angle of the motor swashplate 53 is connected to the trunnion shaft 122.

The shift control device 193 comprises a reversible pulse motor 194, a speed reduction gearing 195 connected to the pulse motor 194, and a ball and nut mechanism 196 connected to the speed reduction gearing 195. The ball and nut mechanism 196 is comprised of a rotatable nut 197 and a threaded shaft 199 threadedly received in the rotatable nut 197 through balls 198. The nut 197 is rotatably supported through a pair of ball bearings 202, 202 on a housing 201 which is secured to the side wall plate 104a of the crank case 104 by a bolt 200, and an output shaft of the speed reduction gearing 195 is connected to one end of the nut 197 through a coupling 203.

An operating shaft 205 is secured to a leading end of the threaded shaft 199 projecting into the crank case 104 by a pin 204, and a tubular shaft 206 is slidably fitted over an outer periphery of the operating shaft 205. To restrict the amount of relative movement of the two shafts 205 and 206 to a given level, a connecting pin 208 slidably passing through an elongated hole 207 in the operating shaft 205 is fitted at its opposite ends in the tubular shaft 206.

Further, the opposite ends of the connecting pin 208, which project from an outer surface of the tubular shaft 206, are fitted in connecting holes 211, 211 at leading ends of a pair of speed shift levers 210, 210 secured to opposite end faces of the trunnion shaft 122 by a bolt 209, and are pressed by a pair of pressing plates 212, 212. Both of the pressing plates 212, 212 are tightened on leading ends of the speed shift levers 210, 210 by a bolt 214 which interconnects such leading ends through a distance collar 213. In this manner, the threaded shaft 199 is connected with the speed shift levers 210, 210 and thereby inhibited from being rotated.

An overload spring 215 is mounted in a compressed manner between the operating shaft 205 and the tubular shaft 206 for urging the connecting pin 208 against a right end face of the elongated hole 207 to hold it thereon.

If the rotation of the pulse motor 194 in a normal direction turns the nut 197 in a normal direction to move the threaded shaft 199 leftwardly as viewed in FIG. 13, the speed shift levers 210, 210 can be swung leftwardly through the operating shaft 205, the connecting pin 208 and the tubular shaft 206 to right the motor swashplate 53 through the trunnion shaft 122. On the contrary, if the pulse motor 194 is reversed to move the threaded shaft 199 rightwardly, the motor swashplate 53 can be tilted down. Particularly, when an overload is applied to the motor swashplate 53 during rightward movement of the threaded shaft 199, a relatively sliding movement is produced between the operating shaft 205 and the tubular shaft 206 and with this relatively sliding movement, the connecting pin 208 is moved within the elongated hole 207, so that such overload may be absorbed due to a compression deformation of the overload spring 215.

The two speed shift levers 210, 210 are disposed to clamp the swashplate anchor 123 therebetween, whereby the axial movement of the trunnion shaft 122 is restrained.

The above-described speed shift control device 193 also controls the second eccentric ring 164 through an interlocking mechanism 220.

The interlocking mechanism 220 comprises a drive lever 222 pivotally mounted on the tubular shaft 206 through a pivot 221, and a bell crank-shaped driven lever 224 pivotally mounted on one side surface of the cylinder holder 124 through a pivot 223.

An operating pin 225 is secured to the drive lever 222 in parallel to the pivot 221 thereof. The operating pin 225 is passed through the operating shaft 205 with no play and also slidably passed through the elongated hole 226 in the tubular shaft 206. Thus, when a relatively sliding movement occurs between the operating shaft 205 and the tubular shaft 206, the drive lever 222 is swung about the pivot 221.

A leading end of the drive lever 222 is opposed to a first abutment pin 227 mounted on and projecting from the an outer surface at one end of the driven lever 224. A second abutment pin 228 is mounted on and projects from an inner surface at the other end of the driven lever 224 in an opposed relation to one end of one of the slide pins 188 secured to the second eccentric ring 164.

Figure 17A:
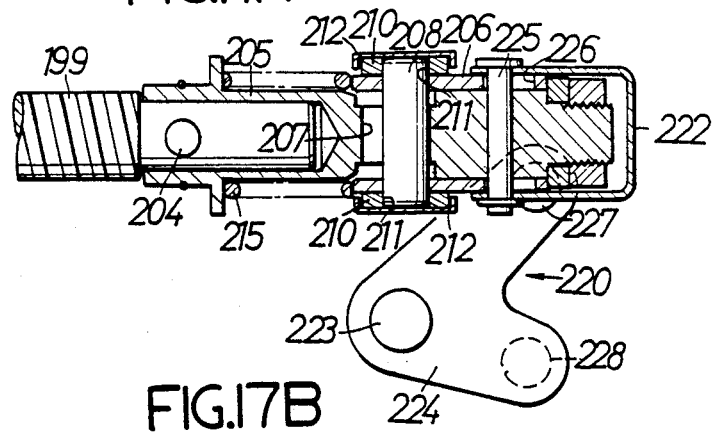
Figure 17B:
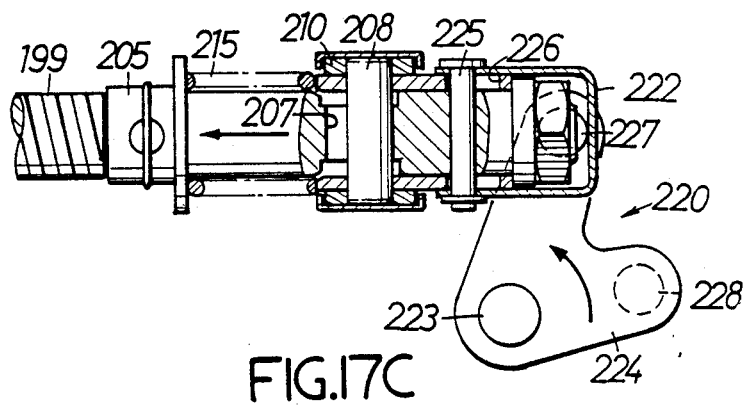
FIGS. 17B and 17C are operational views similar to FIG. 17A.

Thus, if the threaded shaft 199 is moved leftwardly in FIG. 13 as described above to right the motor swashplate 53, the leading end of the drive lever 222 abuts against the first abutment pin 227 of the driven lever 224 when the motor swashplate 53 has come near the righted position, and then, the drive lever 222 pivotally moves the driven lever 224 as shown in FIG. 17B with the subsequent leftward movement of the threaded shaft 199. This pivotal movement causes the second abutment pin 228 to push the slide pin 188 upwardly as indicated by a chain line in FIG. 16, thereby shifting the second eccentric ring 164 against the force of the return spring 191 from the hydraulic pressure transmitting position h toward the lock-up position 1, wherein the second eccentric ring 164 reaches the lock-up position 1 just at the moment when the motor swashplate 53 reaches the righted position.

When the second eccentric ring 164 has reached the lockup position 1, all the second distributor valves 162 simultaneously close the corresponding motor ports b, so that the hydraulic motor 51 is disconnected from the higher pressure outer oil passage 153 to correspondingly decrease the volume in the higher pressure system. As a result, leakage of the hydraulic pressure is reduced, and the incompressibility of the working oil is enhanced, thereby providing an improvement in transmitting efficiency under a condition of a speed shift ratio of 1, i.e., under a top condition.

Figure 17C:
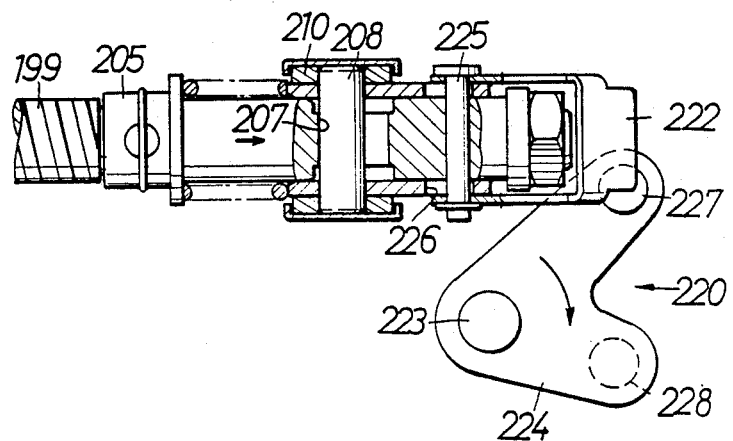
Figure 18:
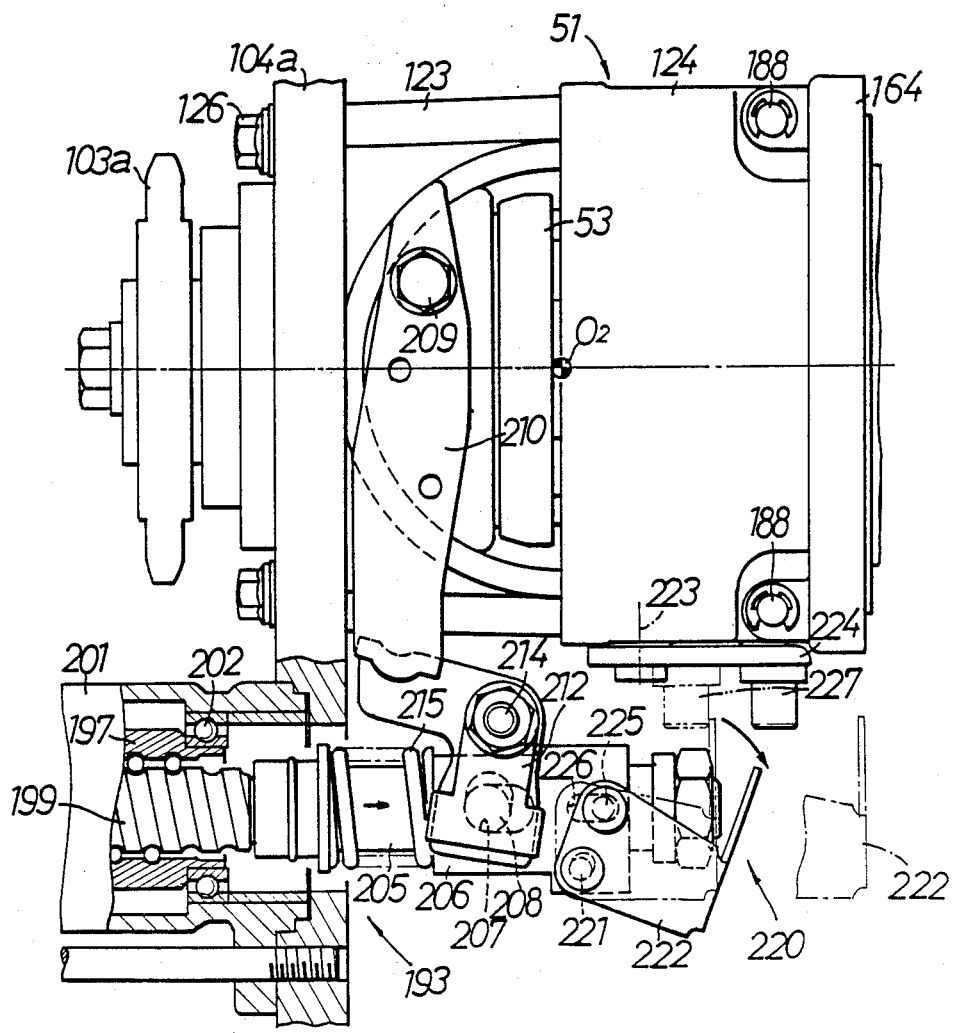
Figure 19:
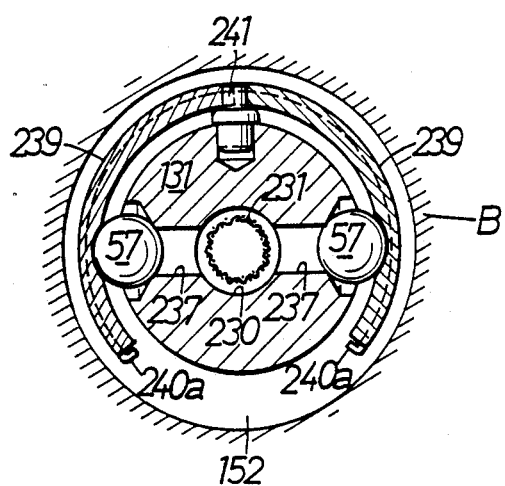
Figure 20:
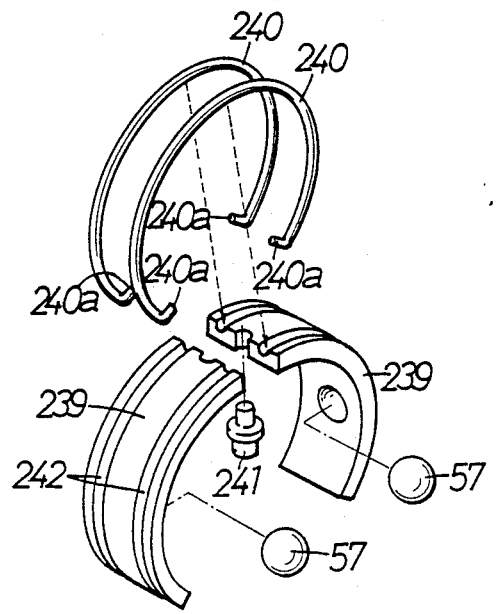

When the threaded shaft 199 is to be moved rightwardly to reincline the motor swashplate 53 from the righted position, the motor swashplate 53 is easily not moved by an attempt to incline it in a condition where all the motor ports b, b—are closed by the second distributor valves 162, 162—. Therefore, at the beginning of rightward movement of the threaded shaft 199, a condition is such that an overload is applied to the motor swashplate 53. For this reason, with the speed shift levers 210, 210 and the tubular shaft 206 integral therewith as well as the connecting pin 208 remaining left in the now positions for a time as shown in FIG. 17C, the threaded shaft 199 and the overload spring 215 are moved rightwardly while compressing the overload spring 215 (see FIG. 18). This causes the operating shaft 205 to move the operating pin 225 rightwardly, thereby turning the drive lever 222 about the pivot 221 in a direction opposite to that described above to release the first abutment pin 227 of the driven lever 224. As a result, the second eccentric ring 164 is returned to the hydraulic pressure transmitting position h by the returning action of the return spring 191, so that the second distributor valve 162 permits the motor port b to communicate with the inner oil passage 152 or the outer oil passage 153.

When the overload is eliminated from the motor swashplate 53 in this manner, the resilient force of the overload spring 215 which has been compressed causes the tubular shaft 206 to move rightwardly relative to the operating shaft 205, starting the downward tilting of the motor swashplate 53. After the connecting pin 208 abuts against the right end face of the elongated hole 207, the motor swashplate 53 can be tilted downwardly as the threaded shaft 199 moves rightwardly. Accordingly, the pulse motor 194 is not subjected to the overload, and it is possible to control the motor swashplate 53 and the second eccentric ring 164 with a relatively small driving torque.

Referring again to FIGS. 5 and 6, a main blind oil passage 230 is made in the central portion of the output shaft 131, and an oil filter 231 is incorporated in the main oil passage 230 over its entire length.

The main oil passage 230 communicates with an oil reservoir 233 through an oil passage 232 provided in the crank case 104, and a supplement pump 56 driven by a gear 234 secured to the cylindrical input shaft 105 is disposed on the way of the oil passage 232 and adapted to continue supplying of an oil into the main oil passage 230 during rotation of the input shaft 105. An oil filter 236 is also disposed in an inlet of the main oil passage 230.

The oil supplied into the main oil passage 230 is filtered in the oil filters 236 and 231, and then passed through a pair of radial supplement holes 237, 237 perforated in the output shaft 131 into the inner oil passage 152. Thus, the oil of an amount corresponding to a leakage of the working oil is supplemented into the hydraulic closed circuit between the hydraulic pump 50 and the hydraulic motor 51.

A first check valves 57, 57 for blocking the reverse flow of an oil from the inner oil passage 152 is provided in the supplement holes 237, 237. The check valves are held by a pair of circular arc-shaped retainer 239, 239 surrounding the output shaft 131 and are biased toward a closed position by a pair of wire springs 240, 240.

The pair of retainers 239, 239 abuts against each other with a support pin 241 embedded in the outer peripheral surface of the output shaft 131 being clamped therebetween. Wire springs 240, 240 are mounted in a series of two peripheral grooves 242, 242 made in the outer peripheral surface of the both retainers 239, 239, with locking claws 240a, 240a at opposite ends of the wire springs 240, 240 being engaged with opened ends of the two retainers 239, 239. In this manner, the two retainers 239, 239 are connected to each other.

During a reverse load operation i.e., during an engine brake operation, the hydraulic motor 51 operates to provide a pumping effect, while the hydraulic pump 50 operates to provide a motoring effect. Therefore, the pressure in the outer oil passage 153 is changed into a lower level, while that in the inner oil passage 152 is into a higher level, so that the working oil intends to reversely flow out of the inner oil passage 152 into the supplement hole 237, but such reverse flow is blocked by the first check valve 57. Thus, the overload is reliably transmitted from the hydraulic motor 51 to the hydraulic pump 50 to provide a good engine brake effect.

An annular oil passage 244 is provided in that outer peripheral surface of the output shaft 131 which is opposed to the inner peripheral surface of the motor cylinder 117, and a radial supplement hole 245 is also perforated in the output shaft 131 for permitting the communication of the main oil passage 230 with the annular oil passage 244.

As seen in FIG. 6, on the other hand, the motor cylinder 117 is perforated with a radial oil passage 246 extending between the adjacent two cylinder bores 118, 118 and having its inner end connected to the annular oil passage 244, and with an axial oil passage 247 permitting an outer end of the oil passage 246 to be exposed to the outer oil passage 153.

A second check valve 58 is incorporated in the axial oil passage 247 for blocking the reverse flow of the working oil from the outer oil passage 153. A valve seat 249 cooperating with the second check valve 58 also serves as a plug for closing an opening of the oil passage 247. The second check valve 58 is biased toward the valve seat 249 by a valve spring 250.

Thus, during a normal overload operation where the outer oil passage 153 is at the higher pressure, the second check valve 58 is maintained closed to block flowing of the working oil out of the outer oil passage 153 toward the oil passage 247. During an engine-brake operation where the outer oil passage is at the lower pressure, the second check valve 58 is opened as the working oil leaks out of the hydraulic closed circuit, so that the working oil can be supplemented from the main oil passage via the annular oil passage 244 and the oil passages 246 and 247 into the outer oil passage 153.

Further, the output shaft 131 is perforated in place with a radial orifice hole 251 for supplying a lubricating oil from the main oil passage to various parts of the transmission 23.

As discussed above, in the transmission of this embodiment, the eccentric ring is connected to the swashplate supporting system through the pair of parallel slide pins for sliding movement in the direction perpendicular to the rotational axis of the cylinder block. Therefore, the displacement of the eccentric ring along the slide pins makes it possible to fulfill the function of a control valve arrangement. Accordingly, an exclusive control valve arrangement is unnecessary, and the simplification of the structure and the compactification of the transmission can be largely anticipated. Moreover, since the eccentric ring is supported on the pair of slide pins, and can be constantly maintained in a stable attitude, the distributor valves can be properly controlled in accordance with their eccentric positions.

The operation of this embodiment will be described below.

Now, if the driver on the motorcycle M depresses down the right brake pedal 9' by the driver's right foot placed on the right step 8', the operating arm 9'a of the right brake pedal 9' is swung upwardly to push the piton rod 18 upwardly, so that the master cylinder 17 delivers a hydraulic pressure through the output port 19, and the rear brake 20r can be operated by the action of that hydraulic pressure. Thus, a master cylinder operating element is disclosed.

During this time, the upward movement of the operating arm 9'a causes the right end of the inner wire 12 to be pushed while compressing the return spring 15. With this pushing, the urging effect of the auxiliary spring is also added, so that the left brake pedal 9 is swung downwardly and cannot interfere with each depressing-down o f the right brake pedal 9' in any way.

If the right brake pedal 9' is released, the both brake pedals 9 and 9' are returned to their original positions by the resilient force, and the rear brake 20r is brought back to its inoperative state.

In addition, if the left brake pedal 9 is depressed down by the driver's left foot placed on the left step 8, the operating arm 9'a of the right brake pedal 9' is swung upwardly through the inner wire 12, so that the output oil pressure from the master cylinder 17 enables the operation of the rear brake 20r in the same manner as when the right brake pedal 9' has been depressed down as described above.

If the left brake pedal 9 is released, the both brake pedals 9 and 9' are likewise returned to their original positions by the resilient force of the return spring, and the rear brake 20r can be brought back to its inoperative state.

In this way, it is possible for the driver on the motorcycle M to control the rear brake 20r at any time through the operation of the brake pedal 9 or 9' by either of left and right foot placed on the steps 8 and 8'. Accordingly, grounding of one foot and controlling of the rear brake can be simultaneously conducted readily even during turning of the motorcycle in either of left and right directions. This is convenient, particularly when the change lever is omitted due to employment of the automatic transmission 23 as in the embodiment of the present invention, because it is possible for the driver to devote himself to grounding of one foot and controlling of the rear brake without consideration of a changing operation.

It should be noted that when a manual multi-stage transmission is employed, a change lever may be disposed in close vicinity to either left or right brake pedal 9 or 9'.

Figure 21:
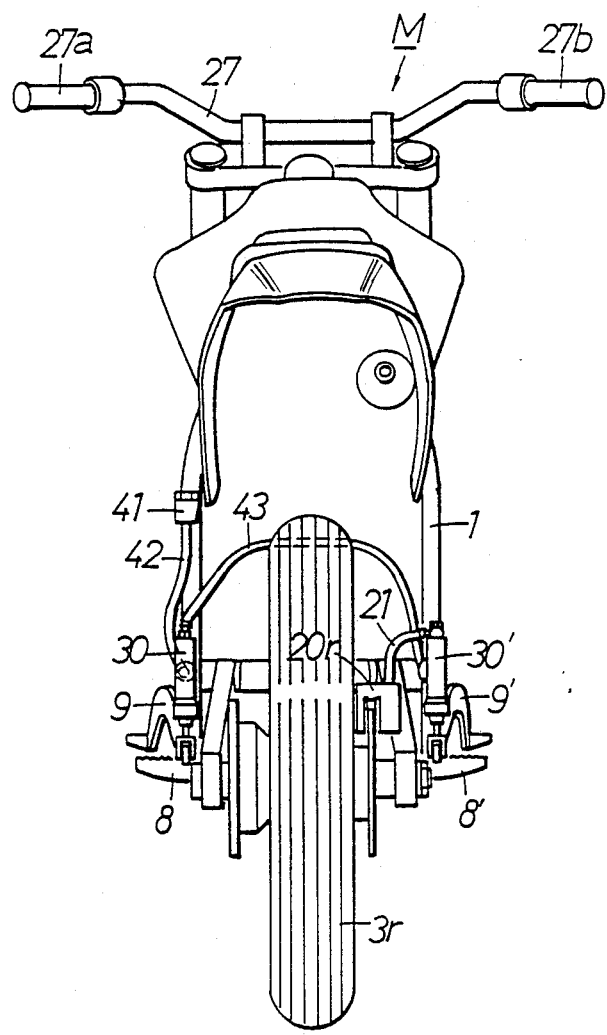

A second embodiment of the present invention will be described below with reference to FIGS. 21 and 22. The left and right brake pedals 9 and 9' either include an operating arm 9a, 9'a extending backwardly from the pivot 10, 10', and a pair of left and right master cylinders 30 and 30' driven respectively by the operating arms 9a and 9'a are attached to the body frame 1.

Each of the master cylinders 30 and 30' comprises a cylinder body 31 secured to the body frame 1, a piston 34 dividing the interior of the cylinder body 31 into an upper hydraulic oil chamber 32 and a lower supplement oil chamber 33, a return spring 35 for biasing the piston 34 downwardly and a piston rod 36 connecting a lower end of the piston 34 to the corresponding operating arm 9a, 9'a. The cylinder body 31 is provided at its upper end with an output port 37 connected to the hydraulic oil chamber 32. In addition, the cylinder body 31 is also provided at one side thereof with an oil reservoir hole 38, a relief port 39 adapted to permit the communication between the oil reservoir hole 38 and the hydraulic oil chamber 32 upon downward movement of the piston 34, and a supply port 40 normally permitting the communication between the oil reservoir hole 38 and the supplement oil chamber 33.

An oil reservoir 41 is connected to the oil reservoir hole 38 in the left master cylinder 30 through a conduit 42. The output port 37 in the left master cylinder 30 is connected with the oil reservoir hole 38 in the right master cylinder 30' through a conduit 43, and the output port 37 in the right master cylinder 30' is connected to the rear brake 20r through a hydraulic oil conduit 21. Thus, the left master cylinder 30 and the right master cylinder 30' are connected in series to each other.

It is to be noted that a well-known cap seal 44 is added to a top end of the piston 34 of each master cylinder 30, 30' to allow supplement of a working oil out of the supplement oil chamber 33 into the hydraulic oil chamber 32 when the hydraulic oil chamber 32 is reduced in pressure.

Other arrangements are similar to those in the previous embodiment and hence, in Figures, the same reference characters are applied to parts corresponding to those in the previous embodiment.

The operation of depressing down of the right brake pedal 9' causes the piston rod 36 and piston 34 of the right master cylinder 30' to be moved upwardly by the operating arm 9' thereof. Thereupon, in the right master cylinder 30', a hydraulic pressure is developed in the hydraulic oil chamber 32 after the cap seal 44 of the piton 34 traverses in front of the relief port 39. That hydraulic pressure can be transmitted through the output port 19 via the hydraulic conduit 21 to the rear wheel brake 20r to actuate the latter.

If the right brake lever 9' is released and the left brake pedal 9 is depressed down, the operating arm 9a of the left brake pedal 9 causes the piston rod 36 and piston 34 of the left master cylinder 30 to move upwardly. Thereupon, in the left master cylinder 30, a hydraulic pressure is developed in the hydraulic oil chamber after the cap seal 44 of the piston 34 passes in front of the relief port 39. Such hydraulic pressure can be transmitted through the output port 37 via the conduit 43 to the oil reservoir hole 38 in the right master cylinder 30' and then through the relief port 39, the hydraulic oil chamber 32, the output port 37 and the hydraulic oil conduit 21 in the right master cylinder 30' to the rear wheel brake 20r to actuate the latter.

What is claimed is:

1. A rear wheel brake operating system for a motorcycle having a pair of left and right steps mounted in a projecting manner on a lower portion of a vehicle body, comprising a pair of left and right brake pedals which are operatively connected to a common rear wheel brake for actuation of said rear wheel brake independently of each other, said left and right brake pedals being pivotally mounted on said vehicle body in close vicinity to said left and right steps, respectively.

2. A rear wheel brake operating system according to claim 1, wherein said pair of brake pedals are operatively connected to a single master cylinder for supplying a hydraulic braking pressure to said rear wheel brake.

3. A rear wheel brake operating system according to claim 1, wherein each of said left and right brake pedals of said pair of brake pedals is operatively connected to a separate one of a pair of master cylinders for supplying a hydraulic braking pressure to said rear wheel brake.

4. A rear wheel brake operating system according to claim 3, wherein said pair of master cylinders are connected in series to each other.

5. A rear wheel brake operating system according to claim 1, wherein said motorcycle includes an automatic transmission.

6. A rear wheel brake operating system according to claim 5, wherein said automatic transmission is a continuously variable transmission.

7. A rear wheel brake operating system according to claim 6, wherein a speed shift ratio set by said automatic transmission is automatically controlled.

8. A rear wheel brake operating system according to claim 5, wherein said automatic transmission includes a manual clutch mechanism.

9. A rear wheel brake operating system according to claim 8, wherein said clutch mechanism includes a clutch operating element mounted on a handle of said motorcycle.

10. A rear wheel brake operating system according to claim 8, wherein said master cylinder includes a master cylinder operating element, and one of said pair of brake pedals is connected to said master cylinder operating element, while the other brake pedal is operably connected to said master cylinder operating element through said one of said pair of brake pedals.

11. A rear wheel brake operating system according to claim 3, wherein each of said pair of master cylinders includes a master cylinder operating element connected to a corresponding one of said pair of brake pedals and includes a chamber in which a hydraulic pressure is developed through operation of said master cylinder operating element, said chambers communicating with each other.

12. A rear wheel brake operating system according to claim 11, wherein one of said chambers communicates with an oil reservoir and also with said rear brake through the other chamber.

13. A rear wheel brake operating system according to claim 12, wherein said other chamber permits a flow of a hydraulic pressure oil therethrough from said one of said chambers to said rear wheel brake.

14. A rear wheel brake operating system according to claim 1, wherein said motorcycle includes a front wheel brake which has a front wheel brake operating element mounted on a handle of said motorcycle.

15. A rear wheel brake operating system according to claim 9, wherein said handle has opposed ends and said motorcycle includes a front wheel brake which has a front wheel brake operating element mounted on one of said opposed ends of said handle, and said clutch operating element of said clutch mechanism is mounted on the other of the opposed ends of said handle.

16. A rear wheel brake operating system according to claim 6, wherein said automatic transmission includes a manual clutch mechanism.

17. A rear wheel brake operating system for a motorcycle having a pair of left and right steps mounted in a projecting manner on a lower portion of a vehicle body, comprising a pair of brake pedals operatively connected to a common rear wheel brake, said pair of brake pedals comprising a left brake pedal and a right brake pedal, said left brake pedal being pivotally mounted on said vehicle body in close vicinity to said left step for operating said rear wheel brake independently of said right brake pedal and said right brake pedal being pivotally mounted on said vehicle body in close vicinity to said right step for operating said rear wheel brake independently of said left brake pedal.

18. A rear wheel brake operating system according to claim 17, wherein said pair of brake pedals are operatively connected to a single master cylinder for supplying a hydraulic braking pressure to said rear wheel brake.

19. A rear wheel brake operating system according to claim 17, wherein each of said left and right brake pedals is operatively connected to a separate one of a pair of master cylinders for supplying a hydraulic braking pressure to said rear wheel brake.

20. A rear wheel brake operating system according to claim 19, wherein said pair of master cylinders are connected in series to each other.

21. A rear wheel brake operating system according to claim 18, wherein said motorcycle includes an automatic transmission.

22. A rear wheel brake operating system according to claim 21, wherein said automatic transmission is a continuously variable transmission.

23. A rear wheel brake operating system according to claim 22, wherein said automatic transmission includes a manual clutch mechanism.

24. A rear wheel brake operating system according to claim 21, wherein said automatic transmission includes a manual clutch mechanism.

25. A rear wheel brake operating system according to claim 24, wherein said master cylinder includes a master cylinder operating element, and one of said pair of brake pedals is connected to said master cylinder operating element, while the other brake pedal is operably connected to said master cylinder operating element through said one of said pair of brake pedals.

26. A rear wheel brake operating system according to claim 19, wherein each of said pair of master cylinders includes a master cylinder operating element connected to a corresponding one of said pair of brake pedals and a chamber in which a hydraulic pressure is developed through operation of said master cylinder operating element, said chambers communicating with each other.

* * * * *